Oct. 10, 1933.   H. HAGER   1,929,780
REPLACEMENT VALVE SEAT FOR INTERNAL COMBUSTION ENGINES
Filed July 14, 1932
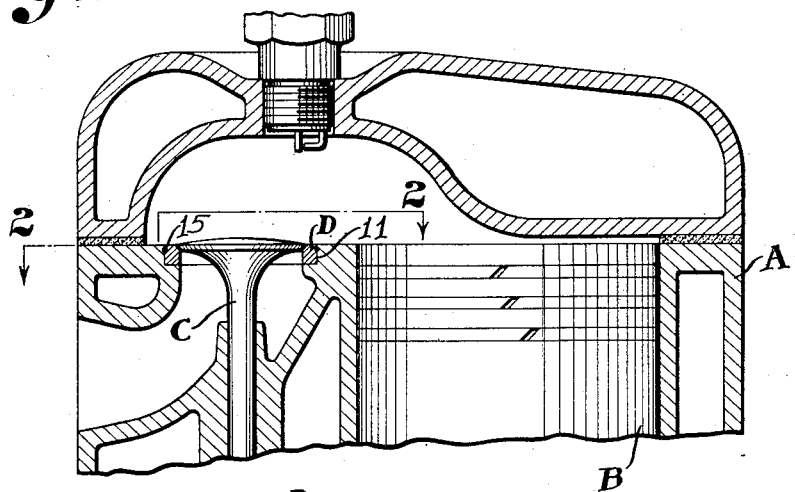
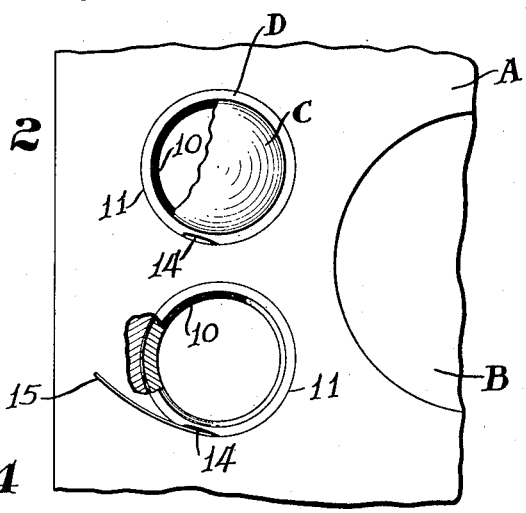
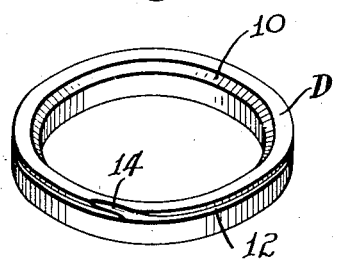
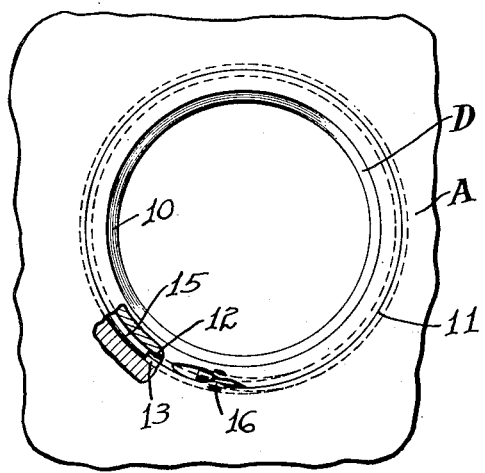
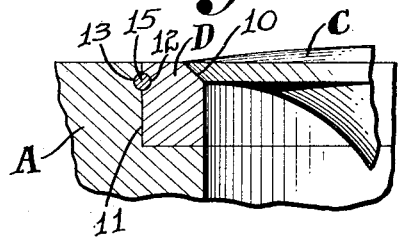
Inventor
Harold Hager
By Owen & Owen
Attorneys Patented Oct. 10, 1933

1,929,780

UNITED STATES PATENT OFFICE 1,929,780

REPLACEMENT VALVE SEAT FOR INTERNAL COMBUSTION ENGINES

Harold Hager, Toledo, Ohio, assignor to The Toledo Steel Products Company, a corporation of Ohio Application July 14, 1932. Serial No. 622,371

5 Claims. (Cl. 123—188)

This invention relates to internal combustion engines, but particularly to removable seats for valves of the poppet type, and an object is to provide novel and efficient means for effectively securing a removable valve seat in place.

Removable valve seats are found to be desirable, particularly since they enable the seat to be of tougher and harder metal than the metal of the cylinder block, and enable the engine to operate over a considerable period of time without the trouble, annoyance and expense of grinding or re-seating the valves. Difficulty has been experienced in securing the removable seat member in place in the cylinder block, and, although means and devices, such as screw threads and dowel pins, have been employed for this purpose, they have been found to be objectionable either because of the additional expense involved, or their inability to keep the seat securely in position, or for other reasons.

In accordance with this invention, a simple and efficient device is provided by which a seat member is inserted in place in the cylinder block, and thereafter in an extremely simple and efficient manner a wire is forced into place which securely retains the seat member in place throughout.

For purposes of illustration, but not of limitation, an embodiment of the invention is shown on the accompanying drawing, in which:

Figure 1 is a sectional elevation of a part of an engine block showing the valve seat member in position;

Figure 2 is a top view substantially on the line 2—2 of Figure 1 showing some of the parts broken away;

Figure 3 is a perspective view of the seat member;

Figure 4 is an enlarged top plan view with a portion thereof broken away of the valve seat member in place; and Figure 5 is an enlarged fragmentary sectional view in vertical elevation of the seat member in place.

The illustrated embodiment of the invention comprises a cylinder block A having a piston B and poppet valve C. A removable or replacement valve seat D comprises an annulus or ring provided with a beveled face 10 to receive the poppet valve C. The valve seat member D is disposed within a recess 11 formed in the cylinder block in the desired position substantially as shown. Formed in the outer surface of the valve seat member D is a relatively shallow groove 12, which extends entirely around the member. In this instance the groove is shown spaced a short distance below the upper surface of the ring, although this position is not essential. Formed in the walls of the recess 11 is a relatively shallow groove 13, which extends entirely therearound, and is adapted to register with the groove 12 when the valve seat member D is in position, as shown particularly in Figure 5.

A diagonal groove 14 extends from the upper surface of the valve insert D to the groove 12, and this groove is of sufficient size to admit a wire 15. In practice the valve seat member D is inserted within the recess or cavity 11, and thereafter the wire 15, which may be of steel, or other suitable material, is introduced at one end into the diagonal groove 14, and thereafter is forced in any suitable manner, as with pliers, to completely fill the complementary grooves 12 and 13. The wire 15 should be of such size as substantially to fill the grooves 12 and 13 in order securely to retain the member D in position. After the wire has completely filled the registering grooves 12 and 13, the outer end is peened, as shown at 16 in Figure 4, or may be welded, cemented, or otherwise suitably secured in the diagonal groove 14 to insure that it will remain in the desired position. In this manner it is manifest that the valve seat member D may be readily and conveniently secured in position in the cylinder block, or may be removed for replacement with a minimum of trouble and effort.

It is to be understood that numerous changes in details of construction, arrangement and operation may be effected without departing from the spirit of the invention, especially as defined in the appended claims.

What I claim as new and desire to secure by Letters Patent is:

1. A new article of manufacture, a valve seat comprising an annulus formed with a peripheral groove, and a wire in said groove having a portion projecting therebeyond, there being a diagonal groove leading from a face of said annulus to said groove to enable insertion of said wire when said annulus is in operative position.

2. In a valve housing formed with a recess, a valve seat member closely fitting said recess, both said valve seat member and said valve housing being formed with complementary grooves, said valve seat member having a groove leading from the outside to said complementary grooves, and a wire inserted through said last groove and substantially filling said complementary grooves.

3. In combination, a valve housing formed with a recess, the wall defining the side of said recess having a groove opening into said recess, a valve seat member disposed within said recess, said valve seat member being of a size to fit snugly into said recess and when operatively disposed therein having its side face engaging the side wall of said recess at both sides of the groove in said side wall, said valve seat member having a complementary groove on the exterior side thereof in alignment with said first groove and a groove extending from the upper side joining said complementary groove, and a wire substantially filling said complementary grooves having one end portion disposed in said last groove.

4. In a valve housing formed with a recess, a valve seat member closely fitting said recess, both said valve seat member and said valve housing being formed with complementary grooves, said valve seat member having a diagonal groove extending from the upper side thereof to said complementary grooves, and a wire adapted to be inserted through said diagonal groove and forced through said complementary grooves for retaining the valve seat within said recess.

5. The combination with a recessed valve port and a groove facing said port, of a replaceable valve seat formed with a complementary groove and disposed in said recess, and means inserted from the outside after said seat is in place and substantially filling said complementary grooves for retaining said seat in place, said seat having an opening affording access to said retaining means when the latter is in place.

HAROLD HAGER.